M. C. BIGNALL.
Bucket for Chain-Pumps.

No. 206,854. Patented Aug. 13, 1878.

Witnesses:
J. P. Th. Lang
G. H. Th. Lang

Inventor:
Mason C. Bignall

UNITED STATES PATENT OFFICE.

MOSES C. BIGNALL, OF ST. LOUIS, MISSOURI.

IMPROVEMENT IN BUCKETS FOR CHAIN-PUMPS.

Specification forming part of Letters Patent No. 206,854, dated August 13, 1878; application filed July 6, 1878.

*To all whom it may concern:*

Be it known that I, MOSES C. BIGNALL, of the city of St. Louis, in the county of St. Louis and State of Missouri, have invented a new and useful Improvement in Valves or Buckets for Chain-Pumps, which improvement is fully set forth in the following specification and accompanying drawings, in which latter—

Figure 1:
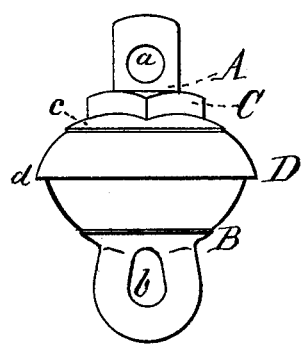
Figure 2:
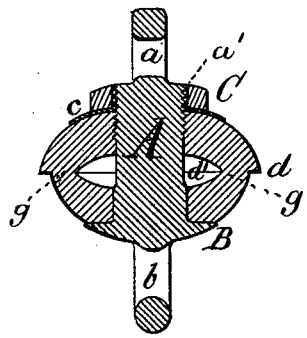

Figure 1 is an elevation of my improved pump-valve. Fig. 2 is a central longitudinal section of the same.

The nature of my invention consists in a chain-pump valve or bucket, the india-rubber packing portion of which is formed of two hollow semi-spheroids of unequal diameters, said semi-spheroids being solidly united together in the manufacture of the packing-pieces, and the upper one overhanging the lower one at the point of junction, and the thinnest portion of the hollow rubber packing-piece being at this point of junction, and consequently any compression of the packing-piece will cause the same to be expanded in a line at right angles to the stem all around, because the lower portion of the spheroid acts as an abutment to the upper portion when compression takes place, and thus liability of slipping of one side of the lower portion upon the inside of the upper portion, as in cases where the packing device is formed of two separate semi-spheres of different diameters, is wholly prevented, and a very perfect packing secured without unduly compressing and expanding the rubber piece of the bucket or valve.

A in the accompanying drawings represents the ordinary stem of a chain-pump valve. It is made with eyes $a$ and $b$, and provided with a flanged seat, B, for the rubber packing-piece D, and a screw-thread, $a'$, concave nut C, and convex washer $c$, whereby the said packing-piece is confined in position and expanded as occasion requires.

The rubber packing-piece D is made hollow, as at $d'$, its chamber being in shape of a very flat spheroid. The outside of the piece D is also in form of a spheroid, but not so flat as that presented by its interior chamber $d'$. The upper portion of the spheroid D, above its horizontal center, is larger in diameter than the portion below said horizontal line, and consequently a step or lip, $d$, extending all around the piece D, is formed at the horizontal line or junction of the two semi-spheroids, which together compose the single packing piece or spheroid D. This reduction of the diameter of the lower portion of the piece D reduces the thickness of the rubber at $g\ g$, and renders the piece more yielding at this point than at any other of its body.

It will be observed that the packing-piece D is one homogeneous piece, and that its upper semi-spheroid unites directly with the lower portion, one acting as a firm abutment against the other in a vertical direction; and hence when the compression-nut C is screwed down the thrust upon the rubber will come upon the thinnest part $g\ g$, and cause it to yield outward in a line at right angles to the stem A.

In this manner a very close joint between the tube of the well and the pump-buckets will be secured without compressing the rubber to such a degree as to granulate or harden it, and thereby increase the friction of the valves or buckets while working and impair their durability.

By making the rubber piece D with a chamber of greater diameter than the passage through it the more ready expansion or compression of the piece D is secured, because the piece, by reason of the chamber being formed in it, as shown, presents in section a very thin portion at $g\ g$, while within this portion, or from the same to the passage through which the stem $d$ passes, it is of a gradually increased thickness, and thus, while the ready expansion of the piece is permitted at $g\ g$, there is sufficient body given to the piece D to enable it to bear the pressure of the compression devices of the bucket or valve.

I am aware that a hollow-sphere bucket or valve without a lip is not new.

I also am aware that two separate pieces of concave rubber of different diameters have been used upon a stem and compressed against one another; but I also am aware that a rubber piece with a lip, and perforated, but without a chamber lateral to the perforation or passage through it, is not new, and such devices I do not claim as my invention.

What I claim as new, and desire to secure by Letters Patent, is—

1. A hollow spheroidal rubber piece, D, perforated centrally, and having a chamber lateral to its central perforation, and formed with a lip, $d$, for a packing for a pump valve or bucket, substantially as described.

2. The hollow rubber piece D, thinned at $g$ $g$ and provided with a lip, $d$, in combination with the stem A and compression-nut C, substantially as and for the purpose described.

MOSES C. BIGNALL.

Witnesses:
O. B. SANSUM,
J. D. BROOKS.